July 22, 1969  E. D. HOUGEN  3,456,532

ROTARY CUTTING TOOL

Filed Nov. 1, 1966

INVENTOR
EVERETT D. HOUGEN
BY
Barnes, Kisselle, Raisch & Choate
ATTORNEYS

3,456,532
ROTARY CUTTING TOOL
Everett D. Hougen, P.O. Box 174,
Flushing, Mich. 48433
Filed Nov. 1, 1966, Ser. No. 591,307
Int. Cl. B23b *51/04;* B27b *33/18*
U.S. Cl. 77—69                           3 Claims

ABSTRACT OF THE DISCLOSURE

A rotary hole cutter having a hollow arbor with a cylindrical blade at one end thereof. A pilot member within the arbor projects axially outwardly of the blade and is biased in an axially outwardly direction by a coil compression spring which has a driving connection at one end with the pilot member and at the other end with an adjusting screw on the arbor.

---

This invention relates to a rotary cutting tool and more particularly to a cylindrical blade type tool for cutting holes in rigid sheet material such as sheet metal, sheet plastic, etc.

Rotary cutting tools of the type described have been known and used for many years. One type of such tool is shown in my prior U.S. Patent 3,104,564 and comprises an arbor on one end of which is mounted a cylindrical blade. A center pilot member extends from within the arbor and projects centrally outwardly of the blade with a sharp point at the end thereof. The pilot is backed by a spring within a bore in the arbor. A bearing ball is interposed between the inner end of the pilot and the adjacent end of the spring so as to reduce the friction between the spring and the pilot. With such an arrangement the pilot remains stationary in a prick-punch mark at the center of the hole being cut while the blader rotates. I have determined that with this type of cutting tool retention of the pilot at the center of the intended hole is more positively assured when the pointed pilot member is driven at the same speed as the cylindrical blade than when the pilot remains stationary. When driven, the pilot tends to penetrate deeper into the sheet material and thus hold more firmly.

It is, therefore, an object of the present invention to provide a cutting tool of the above described type which is very economical in construction and which at the same time assures a driving connection between the arbor and the pilot member.

Other features and objects of the invention will become apparent from the following description and drawing in which.

Figure 1:
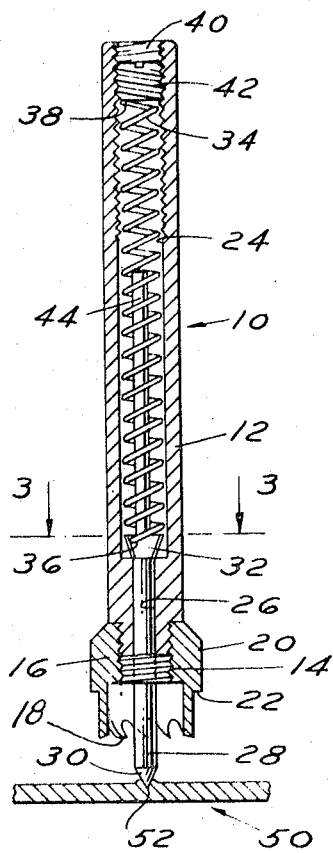
FIGURE 1 is a longitudinal sectional view of a rotary cutting tool according to the present invention.
Figure 2:
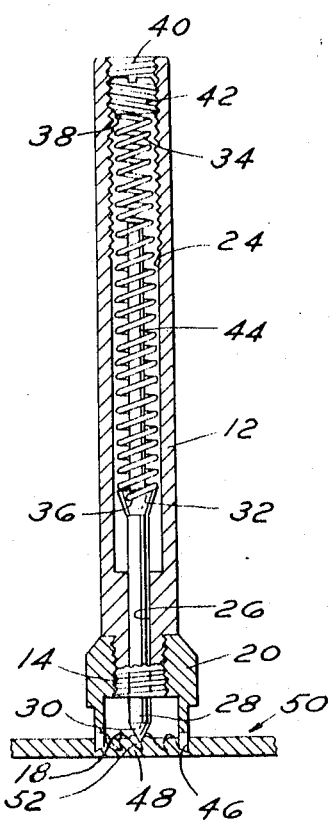
FIGURE 2 is a view similar to FIG. 1 and showing the manner in which the tool is used.
Figure 3:
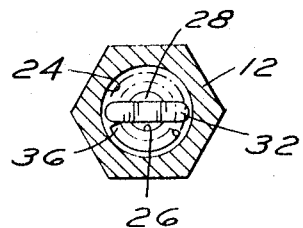
FIGURE 3 is a sectional view along the line 3—3 in FIG. 1.

The rotary cutting tool 10 of the present invention includes a cylindrical body or arbor 12 that is adapted to be received in a suitable tool-holding means of a rotary power supplying device such as a chuck of an electric drill, not shown. In the embodiment illustrated, body 12 is of hexagonal shape, although it can be circular in cross section. The forward or leading end portion of arbor 12 is provided with an external right-hand thread 14 on which is threaded a cylindrical cutter blade 16. Cutter blade 16 is provided with teeth 18 which are adapted to cut a circular groove in sheet metal when the tool 10 is rotated in the conventional right-hand or clockwise direction. The threaded end of cutter 16 is enlarged externally as at 20 to provide a radial shoulder 22 spaced axially inwardly from the cutting teeth 18, this spacing determining the maximum penetration for which the cutter blade is designed.

The cylindrical arbor 12 is centrally bored as at 24. Bore 24 is reduced as at 26 to receive a pilot member 28. Pilot 28 is formed of a hardened material such as tool steel and has a sharp point 30 at its outer end. The opposite end of pilot 28 is flattened as at 32 to the configuration of a blade or the like. The flattened blade portion 32 limits the extent to which pilot 28 can project outwardly beyond the teeth 18 of cutter blade 16.

Within the central bore 24 of arbor 12 there is arranged a coil spring 34. Spring 34 is a right-hand wound spring with its oposite ends 36, 38 cut off sharp; that is, the ends of the spring are not ground flat so as to present a plane perpendicular to the axis of the spring. The ends 36, 38 of spring 34 are in the form of sharp projections on the end spiral convolutions of the spring. This is one of the important features of the present invention. The rear or upper end of bore 24 has a left-hand thread 40 to receive a left-hand threaded adjusting screw 42. Screw 42 can be advanced and retracted in the threaded socket 40 to vary the compression in spring 34 and, thus, vary the pressure required to retract pilot 28 axially of rotary cutter 16. With this arrangement it will be observed that the end 36 of spring 34 overlaps and engages one of the flat sides of the flattened portion 32 of pilot 28 and the end 38 of spring 34 frictionally engages and bites into the inner end of screw 42. Within the spring 34 there is arranged a rod 44 the purpose of which is to determine the maximum inward retraction of pilot 28 relative to the crests of cutting teeth 18.

In operation arbor 12 is mounted in the chuck of a power driven drill or the like and the point 30 of pilot 28 is pressed against the panel of sheet metal 50 or other material to be cut at the exact location of the desired hole. If necessary, a small prick-punch depression may be then started and pressure is applied toward the sheet metal being drilled so that the pilot retracts as the blade cuts through. With the arrangement described, when arbor 12 is rotated in a clockwise direction as viewed from the top in FIG. 1, pilot 28 will be positively driven. This results from the fact that the end 38 of spring 34 has a firm frictional engagement with the inner end of adjusting screw 42 and the end 36 of the spring 34 has a driving connection with the flattened portion 32 of pilot 28. Experience has shown that when pilot 28 is driven the point 30 penetrates substantially deeper into the sheet metal than would be the case if pilot 28 were to remain stationary. As the teeth 18 penetrate into the sheet metal they cut a groove 46 therein and eventually penetrate through the sheet metal so that the force of spring 34 projects the circular slug 48 out from within the inner cylindrical bore of cutter 16. It will be observed that the width of flattened portion 32 is greater than the inner diameter of spring 34 so that the spring not only drives pilot 28 but also exerts axial pressure against pilot 28 tending to drive it outwardly of cutter 16. As the cutter 16 is being driven through the sheet 50 the point 30 penetrates into and deepens the center punch depression 52 so as to maintain the cutter centered at the hole being cut. This eliminates any tendency for the cutter to skip along the sheet metal, especially if the axis of the cutter is slightly non-perpendicular to the plane of the panel in which the hole is being cut.

The use of a left-hand thread at 40 and on screw 42 is preferred so that there will be no tendency of the spring 34 to back-off screw 42 when arbor 12 is rotated. If the thread at 40 were a right-hand thread, there would be a possibility of spring 34 retracting screw 42 out of bore 24 if pilot 28 tended to remain stationary while the cutter was rotating. With the thread on screw 42 being of lefthand direction any tendency of spring 34 to drive screw 42 would simply advance screw 42 in bore 24 against the increased pressure exerted by spring 34.

If the cutter is being used on a double thickness of sheet metal such as two sheet metal panels spot welded together as shown in my Patent No. 3,104,564, screw 42 is adjusted such that rod 44 will bottom on screw 42 when the point 30 of pilot 28 has receded inwardly beyond the ends of teeth 18 a distance corresponding to a single thickness of the sheet metal. When screw 42 is adjusted in this manner a slug 48 will be cut from the uppermost sheet of metal and further penetration of the cutter into the underlying sheet of metal will be prevented because rod 44 will have bottomed against screw 42.

Thus it will be seen that I have provided a rotary cutting tool wherein a positive drive is provided to the pilot member of the tool in a very economical manner. The arrangement described herein eliminates the necessity of a costly driving and sliding connection between the arbor 12 and the pilot 28.

The positive driving connection from the arbor 12 to pilot 28 is obtained by merely forming the ends 36, 38 of spring 34 as radial projections; that is, the ends of the spring are not flattened as is conventional. Thus the radial projection formed by the end 36 of the spring 34 engages the flattened blade portion 32 of pilot 28 to form a positive drive connection between the spring and the pilot and the radial projection formed by the end 38 of the spring 34 digs into the inner end of screw 42 to provide a positive driving connection between the spring and the arbor.

I claim:

1. A rotary cutting tool for cutting holes in sheet metal and the like comprising an arbor having a cylindrical blade rigidly mounted at the leading end to rotate therewith, teeth on said blade designed for cutting when the arbor is rotated in a righthand direction, said arbor having a central bore extending therethrough, said bore being reduced at the leading end of the arbor, a pilot member extending through the reduced bore with its outer leading end sharpened to a point and its inner end projecting into the larger portion of the bore, means at the inner end of the pilot member forming an enlargement which limits movement of the pilot member axially outwardly of the bore and forming a radially facing shoulder thereon, a righthand wound coil compression spring extending axially within the larger bore, the convolution at each of the opposite ends of said spring having a spiral configuration to the free end thereof (as distinguished from being flattened) so that each of the opposite free ends of the spring provides a generally radially facing abutment, a threaded screw closing the larger bore at the rear end of the arbor and adjustable lengthwise of the arbor, said spring being compressed between said screw and the inner end of said pilot member with one free end of the spring engaging said shoulder on the pilot member to form a positive driving connection therebetween when the spring is rotated in a righthand direction from the end adjacent the screw, the other free end of the spring frictionally engaging the inner end of the screw to form a driving connection between the arbor and the spring.

2. A rotary cutting tool as called for in claim 1 wherein said pilot member comprises a generally cylindrical pin, said pin being flattened at its inner end portion to form an axially extending blade-like projection which defines said enlargement and said radially facing shoulder.

3. A rotary cutting tool as called for in claim 2 wherein said adjusting screw has a left-hand thread by means of which it is threaded into said bore.

References Cited

UNITED STATES PATENTS

| 765,877 | 7/1904 | Brownstein | 77—69 |
| 1,331,189 | 2/1920 | Farrell | 77—69 |
| 2,852,968 | 9/1958 | Rowley | 77—69 |

FOREIGN PATENTS

| 928,210 | 5/1947 | France. |

FRANCIS S. HUSAR, Primary Examiner

U.S. Cl. X.R.
143—85; 145—119

PO-1050
(5/69)

UNITED STATES PATENT OFFICE
CERTIFICATE OF CORRECTION

Patent No. 3,456,532             Dated July 22, 1969

Inventor(s)             EVERETT D. HOUGEN

It is certified that error appears in the above-identified patent and that said Letters Patent are hereby corrected as shown below:

Column 1, line 36, cancel "blader" and insert -- blade --.
Column 2, line 37, after "may be" insert -- initially formed at the location of the hole. The drill is --.

SIGNED AND
SEALED

NOV 18 1969

(SEAL)
Attest:

Edward M. Fletcher, Jr.
Attesting Officer

WILLIAM E. SCHUYLER, JR.
Commissioner of Patents